Jan. 29, 1946.  R. J. MILLER  2,393,862

FLUID TRANSMISSION

Filed Feb. 4, 1944  2 Sheets-Sheet 1

INVENTOR.
RAYMOND J. MILLER
BY
O. H. Fowler
ATTORNEY.

Jan. 29, 1946. R. J. MILLER 2,393,862
FLUID TRANSMISSION
Filed Feb. 4, 1944 2 Sheets-Sheet 2

INVENTOR.
RAYMOND J. MILLER
BY
ATTORNEY.

Patented Jan. 29, 1946

2,393,862

UNITED STATES PATENT OFFICE 2,393,862

FLUID TRANSMISSION

Raymond J. Miller, Detroit, Mich., assignor to Bendix Aviation Corporation, Detroit, Mich., a corporation of Delaware Application February 4, 1944, Serial No. 521,104

10 Claims. (Cl. 60—54)

This invention relates to transmissions, and more particularly to that type known as fluid torque converters.

Broadly the invention comprehends a fluid transmission including an impeller, a turbine and a reaction member, and means on the impeller and turbine cooperating to provide a fluid coupling adapted through suitable mechanisms to increase and decrease the blade area of the impeller as conditions require.

An object of the invention is to provide a fluid torque converter including an impeller, a turbine, a reaction member, and means controlled by fluid reaction adapted to vary the operating blade area of the impeller.

Another object of the invention is to provide a fluid torque converter including an impeller, a turbine, a reaction member, a bladed member on the impeller, a bladed member on the turbine, and means associated with the bladed member on the turbine for varying the operating area of the impeller.

A further object of the invention is to provide a fluid transmission including an impeller, a turbine driven thereby, a reaction member cooperating with the impeller and turbine, a fluid coupling intermediate the impeller and turbine, and means associated with a member of the coupling for varying the blade area of the impeller.

A still further object of the invention is to provide a fluid transmission comprising an impeller, a turbine providing in conjunction with the impeller a fluid circuit, blades on the turbine and impeller, bladed members within the respective impeller and turbine, an axially movable shroud on the impeller blades, and means associated with one of the bladed members for actuating the shroud.

Another object of the invention is the provision of a fluid torque converter including an impeller, a turbine associated therewith, a reaction member, and means associated with the impeller and turbine for varying the blade operating area of the impeller.

Other objects and advantages of the invention will appear from the following description taken in connection with the drawings forming a part of this specification, and in which.

Figure 1:
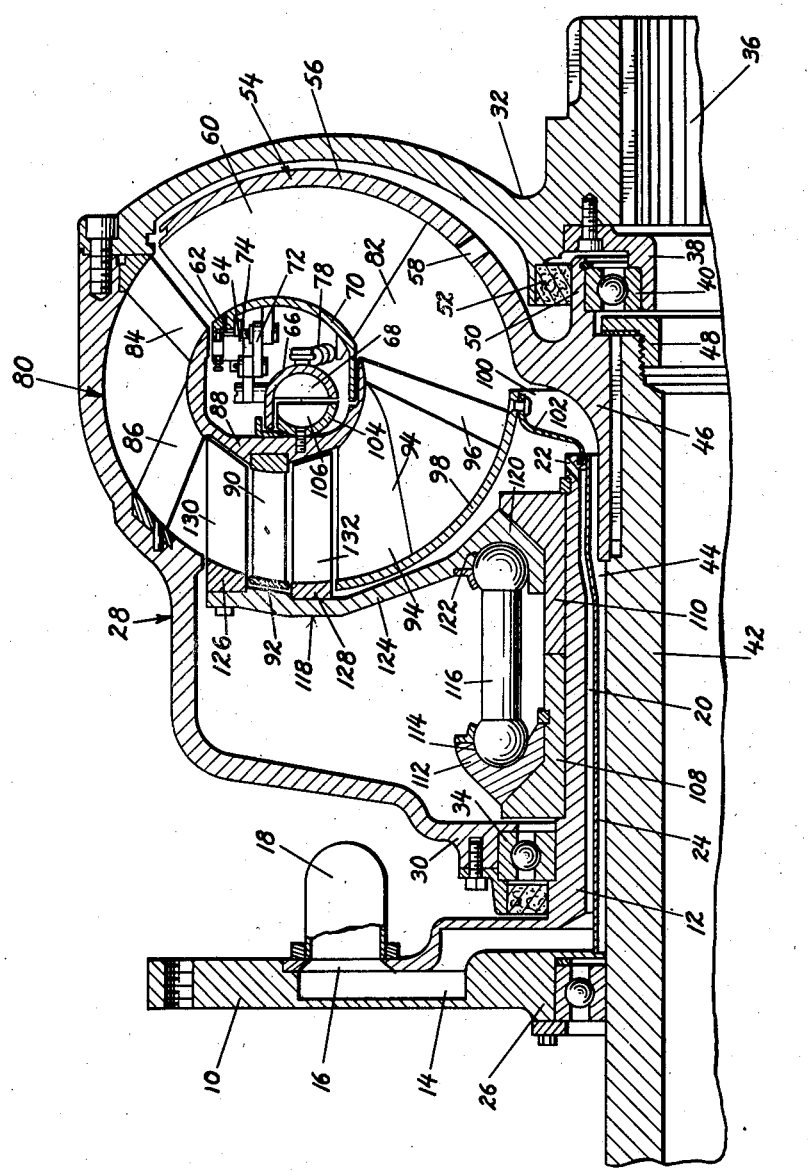
Fig. 1 is a vertical sectional view of a fluid torque converter embodying the invention.
Figure 2:
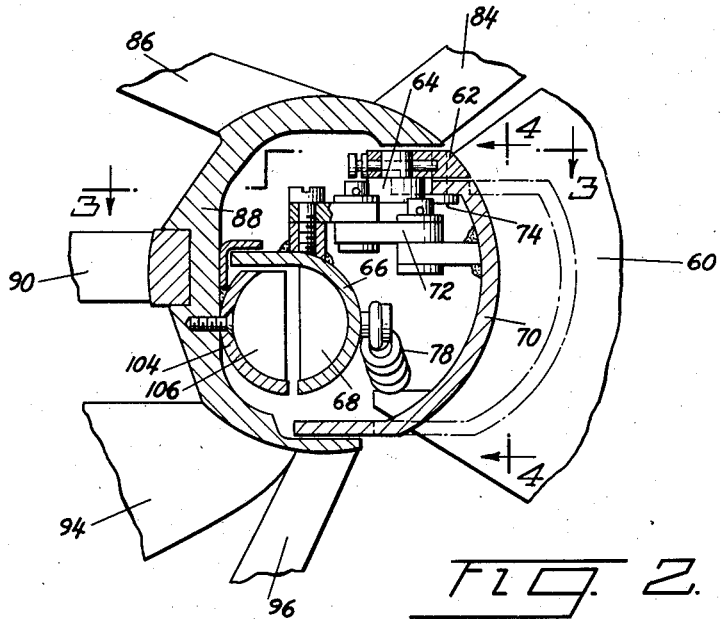
Fig. 2 is an enlarged fragmentary sectional view of the impeller shroud actuating mechanism.
Figure 3:
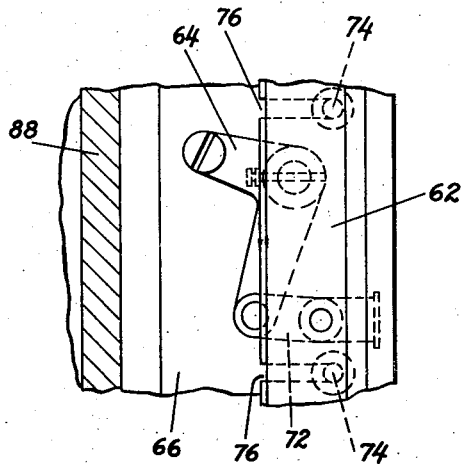
Fig. 3 is a sectional view substantially on line 3—3, of Fig. 2.
Figure 4:
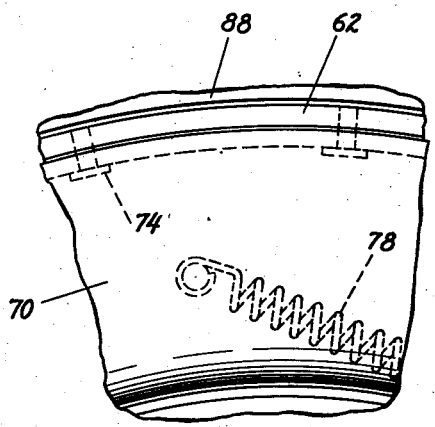
Fig. 4 is a view taken substantially on line 4—4 of Fig. 2.

Referring to the drawings for more specific details of the invention, 10 represents a stationary frame having rigidly secured thereto a sleeve 12 and providing in conjunction therewith a passage 14 terminating in an opening 16 in the sleeve. A fluid conduit 18 connected to a fluid pump system, not shown, communicates with the opening 16. The sleeve 12 is internally slotted to provide a channel 20 terminating in an opening 22 and the channel 20 is covered by a tube 24 fitted snugly in the sleeve. The stationary frame 10 also has a bearing support 26 concentrically disposed with relation to the sleeve 12.

A housing 28 has oppositely disposed axial hubs 30 and 32. The hub 30 receives a bearing 34 fitted on the stationary sleeve 12 and the hub 32 has internal splines 36 for the reception of a driven shaft, not shown, and bolted or otherwise secured on the hub 32 is a bearing support 38 for the reception of a bearing 40.

A driving shaft 42 is fitted in the tube 24 with ample clearance to provide an annular passage 44. The shaft has splined thereon a hub 46 held against displacement by a retaining ring 48 threaded in the end of the shaft, and the hub 46 has a concentrically disposed sleeve 50 for the reception of bearing 40, and a fluid seal 52 is interposed between the sleeve 50 and hub 32 of the housing 28.

An impeller indicated generally at 54 includes an outer shroud 56 integral with the hub 46, and the shroud has an opening 58 therethrough for the passage of fluid so as to balance the pressure on the inner and outer faces of the shroud.

The outer shroud 56 has arranged thereon blades 60 and an annular ring 62 is supported by the blades. The annular ring 62 has pivoted thereon a lever 64 one end of which supports a semi-circular annular shroud 66 having mounted therein blades 68, and the other end of the lever is connected to an inner shroud 70 of the impeller by a toggle 72. The ring 62 has pins 74 therein adapted to cooperate with slots 76 in the shroud 70 so as to inhibit relative rotation of the shroud and ring but at the same time provide for axial movement of the shroud 70 relative to the ring 62 and impeller blades 60. A spring 78 mounted between the shrouds 66 and 70 serves to retain the shroud 70 in retracted position on the blades 60. The shroud 70 is slotted to receive and slide on the impeller vanes 60.

A turbine indicated generally at 80 cooperates with the impeller to provide a vortex chamber 82 for the circulation of fluid. The turbine is of the three-stage type. The first stage includes two sets of vanes 84 and 86 secured to the rotatable housing 28, and the sets are spaced apart by a free equalizing vortex. The vanes 84 and 86 support an inner shroud section 88 cooperating with shroud section 70 of the impeller.

The second stage of the turbine has vanes 90 supporting an outer shroud 92; and the third stage of the turbine includes two sets of vanes 94 and 96 alike in structure and arrangement to the vanes 84 and 86 of the first stage, the vanes 94 and 96 supporting an outer shroud 98 having one of its ends spaced from the hub 46 to provide a fluid inlet 100 to the vortex chamber. The shroud 98 has secured thereto a ring 102 having wiping engagement with the stationary sleeve 12 and serving to complete the channel 44.

The inner shroud 88 of the turbine has affixed internally thereof a semi-circular shroud 104 mounting blades 106 adapted to provide in cooperation with the shroud 66 and blades 68 a fluid coupling, the purpose of which will hereinafter appear.

The stationary sleeve 12 has fixedly secured thereon bearing races 108 and 110. Bearing race 108 has mounted securely thereon an annular ring 112 provided with sockets 114 for the reception of toggles 116.

A retractile reaction member for cooperation with the impeller and turbine is indicated generally at 118. The reaction member includes a carrier 120 mounted for travel on the bearing races 108 and 110, and the carrier has sockets 122 therein for the reception of one end of the toggles 116. The toggle is adapted to provide for the retractile movement of the reaction member upon slight rotation thereof in the fluid circuit.

The carrier supports a spider 124 having secured thereto outer shrouds 126 and 128, and arranged on the respective shrouds are spaced sets of vanes 130 and 132 adapted to straddle the vanes 90 of the second stage of the turbine. The vanes 130 are characterized in that they are streamline vanes having high lift and are substantially overbent so as to quickly influence the turning moment of the fluid; and the vanes 132 are streamline vanes having relatively low lift and are effective for equalizing the flow stream.

Fluid is supplied to the vortex chamber 82 from a suitable source, not shown, by way of the annular passage 44 and inlet 100, and returned to the source of supply by way of the clearances between the shrouds of the turbine and reaction member 128 to the housing, and thence through the opening 22, passages 20 and 14, thence through opening 16 and conduit 18 to the source of supply.

In a normal operation, rotation of the impeller 54 by force transmitted through the drive shaft 42 results in energization of the fluid in the vortex chamber 82. As the fluid enters the turbine, the energy of the fluid is absorbed by the vanes of the respective stages of the turbine 80 and the reaction member. This results in rotation of the turbine and the consequent transmission of force through the hub 32 thereof to a driven shaft, not shown.

During this stage of operation, wherein the impeller is rotating at low speeds and the efficiency of the transmission is substantially a minimum, the turbine is rotating at reduced speed relative to the impeller.

Concomitantly with the rotation of the impeller and turbine, the blades 68 and 106 rotate respectively with the impeller and turbine, with a resultant drag being imposed upon rotation of the blades 68 by the blades 106 through the medium of the fluid in the transmission. The drag imposed on the blades 68 is such as to overcome the resistance of the spring 78, resulting in relative rotation between the blades 68 and the impeller 54, thereby providing for pivotal action of the lever 64 and movement of the toggle 72 to effect an axial movement of the inner impeller shroud 70.

The axial movement of the shroud 70 provides for a reduction in the operating area of the impeller blades, thus increasing the torque output of the transmission because of the change in ratio of the blade area of the impeller to the vane area of the turbine. With the resultant change in ratio of the impeller to the turbine at low speeds of the impeller, the transmission is effective to produce maximum torque output without too greatly sacrificing efficiency of the transmission.

At the same time that the turbine is receiving energy from the impeller, the reaction member 118 remains in the flow stream of the fluid circuit due to the fluid flow impinging on the backs of the vanes 130 and 132, and is effective to provide for torque multiplication of the transmission.

Because of the particular character and arrangement of the vanes 84 and 86 on the first stage of the turbine, the maximum energy is absorbed from the fluid and the flow stream is equalized as the fluid enters the reaction member through vanes 130 and passes through the second stage turbine vanes 90, thence to vanes 132 of the reaction member, wherein, due to the character and arrangement of vanes 130 and 132, the maximum reaction force with accompanying high torque multiplication is produced. The flow stream of fluid from vanes 132 is directed in the most efficient path so that vanes 94 and 96 of the third stage of the turbine receive further energy from the fluid and equalize the flow stream and effectively direct the fluid to the impeller.

Upon attaining a predetermined speed of the impeller and associated turbine, the flow stream in the vortex chamber changes and the fluid impinges on the backs of the reaction vanes 130 and 132. This results in automatic movement of the reaction member 118 on the bearing races 108 and 110, and the consequent withdrawal of the vanes 130 and 132 from the fluid circuit due to the pivoting action afforded by toggles 116 between the ring 112 and carrier 120. Upon the full retraction of the reaction vanes 130 and 132 from the fluid circuit, the transmission functions as a fluid coupling approaching a 1 to 1 operating ratio.

As the operating ratio approaches 1 to 1, the drag imposed on the fluid by vanes 106 subsides, wherein the vanes 106 and 68 are rotating at approximately the same speed and the spring 78 acts to rotate the vanes 68 and shroud 66 relative to the shroud 70 and blades 60 effective through the medium of lever 64 and toggle 72 to retract the shroud 70 to its normal position and thus provide for increase of the impeller blade area. With an increase in the blade area of the impeller, the transmission is effective to operate at highest efficiency in its fluid coupling stage.

Upon demand for increased torque, the direction of the fluid stream in the vortex chamber again changes so that the fluid initially impinges on the faces of the vanes 130 and 132, and this results in travel of the reaction member on the bearing races 108 and 110 into the fluid circuit. At the same time the slippage occurring between the impeller and turbine again results in the shroud 70 being moved axially through the medium of "fluid coupling" 66, 68, 104 and 106, lever 64, and toggle 72 to decrease the operating area of the impeller. This completes the cycle of operation from starting speed through high speed, together with the accompanying torque demand stages of operation of the transmission.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a fluid transmission, an impeller, a turbine for cooperation with the impeller, a reaction member for cooperation with the impeller and turbine, and means on the turbine and impeller adapted to cooperate to vary the blade area of the impeller.

2. A fluid transmission comprising an impeller, a turbine providing in conjunction with the impeller a fluid circuit, and means internally of the circuit controlled by the cooperative action of the impeller and turbine for varying the bladed area of the impeller.

3. A fluid transmission comprising an impeller, a turbine providing in conjunction therewith a fluid circuit, a reaction member in the circuit, an axially movable shroud on the impeller, and means associated with the impeller and turbine for actuating the shroud.

4. A fluid transmission comprising an impeller, a turbine providing in conjunction therewith a fluid circuit, a reaction member in the circuit, blades and vanes respectively on the impeller and turbine, bladed members on the impeller and turbine adapted to cooperate with one another, and means associated with one of the bladed members for varying the effective area of the blades on the impeller.

5. A fluid torque converter comprising an impeller, a turbine providing in conjunction therewith a fluid circuit, a reaction member movable into and out of the fluid circuit, blades on the impeller, vanes on the turbine, a shroud supported on the turbine vanes, a shroud axially movable on the impeller blades, and means mounted internally of the shrouds adapted to move the shroud on the impeller blades so as to vary the blade area of the impeller.

6. A fluid torque converter comprising an impeller, a turbine providing in conjunction therewith a fluid circuit, a reaction member movable into and out of the fluid circuit, blades on the impeller, vanes on the turbine, a shroud supported on the turbine vanes, a shroud axially movable on the impeller blades, a shrouded blade member on the turbine shroud, and a shroud bladed member linked to the impeller shroud adapted upon rotation relative to the impeller to actuate the impeller shroud.

7. A fluid transmission comprising an impeller, a turbine providing in conjunction therewith a fluid circuit, a reaction member in the circuit, and means on the impeller and turbine adapted to cooperate to decrease the effective blade area of the impeller when the transmission is operating as a torque converter.

8. A fluid transmission comprising an impeller, a turbine providing in conjunction therewith a fluid circuit, a reaction member in the circuit, and means on the impeller and turbine adapted to cooperate to vary the effective blade area dependent on the relative speed of the impeller and turbine.

9. A fluid transmission comprising an impeller, a turbine providing in conjunction therewith a fluid circuit, a reaction member in the circuit, and means on the impeller and turbine adapted to cooperate to decrease the effective blade area of the impeller when the transmission is operating as a torque converter and to increase the blade area of the impeller when the speed ratio of the transmission approaches 1 to 1.

10. A fluid torque converter comprising an impeller, a turbine providing in conjunction therewith a fluid circuit, a reaction member movable into and out of the fluid circuit, blades on the impeller, vanes on the turbine, a shroud supported on the turbine vanes, a shroud axially movable on the impeller blades, a shrouded blade member on the turbine shroud, and a shrouded blade member cooperating with the impeller shroud adapted to move the impeller shroud axially to decrease the effective blade area of the impeller when the shrouded blade member on the turbine imposes a drag on the shrouded blade member associated with the impeller through the medium of the fluid.

RAYMOND J. MILLER.